United States Patent [19]

Tamai et al.

[11] 4,394,420
[45] Jul. 19, 1983

[54] MAGNETIC RECORDING MEDIUM

[75] Inventors: Kiminori Tamai; Masashi Hayama, both of Tokyo, Japan

[73] Assignee: TDK Electronics Co., Ltd., Tokyo, Japan

[21] Appl. No.: 316,407

[22] Filed: Oct. 29, 1981

[30] Foreign Application Priority Data

Nov. 19, 1980 [JP] Japan .................... 55-163056

[51] Int. Cl.³ .............................. B32B 9/04
[52] U.S. Cl. .................... 428/447; 428/695; 428/900
[58] Field of Search .............. 428/900, 695, 447

[56] References Cited

U.S. PATENT DOCUMENTS 4,171,406 10/1979 Yamaguchi et al. ........... 428/900 X
4,267,206 5/1981 Johnson ..................... 428/900 X Primary Examiner—Bernard D. Pianalto
Attorney, Agent, or Firm—Oblon, Fisher, Spivak, McClelland & Maier

[57] ABSTRACT

A magnetic recording medium having a magnetic layer comprises a magnetic powder, a binder, a nonionic or anionic surfactant and a silicone oil having a viscosity of 500 c.s. or lower.

1 Claim, 4 Drawing Figures

MAGNETIC RECORDING MEDIUM

BACKGROUND OF THE INVENTION

1. Field of the Invention

The present invention relates to a magnetic recording medium especially a magnetic recording tape used for sound-recording picture-recording or recording in a computer, which is prepared by coating a magnetic composition of a magnetic powder and a binder on a base film. More particularly, it relates to a magnetic recording medium which improves wow and flutter in the reproducing or the recording and reproducing operation after storage of the magnetic recording medium at high temperature.

2. Description of the Prior Art

When a magnetic recording tape is applied in a recording-reducing device such as a cassette deck, the magnetic recording tape runs in contact with a magnetic head and tape guides. Therefore, it is usually required to have a low friction and to maintain the smooth and stable running characteristic. However, the running characteristics of the magnetic recording tape is remarkably inferior at the part of the tape near the core in the running of the tape especially in the running after storage of the tape at relatively high temperature. Thus, the wow and flutter is inferior.

Recently, the magnetic recording tape has been developed and an audio cassette tape has been used not only in room but also in outdoor. For example, when an audio cassette tape is placed in a car parked in sunshine in summer, it is stored at high temperature for a long time. The wow and flutter in the reproducing or the recording and reproducing operation after the storage at high temperature is serious problem. It has been considered the wow and flutter is deteriorated by tackiness of the magnetic layer caused by blooming of a nonionic surfactant or an anionic surfactant admixed with a magnetic powder and a binder or plasticization of the magnetic layer.

The nonionic surfactant or the anionic surfactant has been incorporated to improve the dispersibility of the magnetic powder in the blending of the magnetic powder and the binder, whereby magnetic characteristics of suquareness ratio and Br of the magnetic recording tape are improved. The blooming of the nonionic surfactant or the anionic surfactant or the plasticization of the magnetic layer can be reduced to improve the wow and flutter by reducing the amount of the nonionic surfactant or the anionic surfactant. On the other hand, the magnetic characteristics as the magnetic recording tape are inferior.

SUMMARY OF THE INVENTION

It is an object of the present invention to provide a magnetic recording medium which has excellent magnetic characteristics and excellent wow and flutter characteristic even after storage at high temperature.

The foregoing and other objects of the present invention have been attained by providing a magnetic recording medium which comprises a silicone oil having a viscosity of 500 c.s. or lower and a nonionic or anionic surfactant in a magnetic layer.

DETAILED DESCRIPTION OF THE PREFERRED EMBODIMENTS

In the present invention, a nonionic surfactant or anionic surfactant is incorporated at an effective ratio for improving dispersibility of the magnetic powder and a silicone oil having a viscosity of 500 c.s. or lower such as dimethyl polysiloxane is also incorporated to overcome the disadvantageous effects of the blooming and the plasticization of the magnetic layer whereby the stable running of the magnetic recording tape is attained and the wow and flutter is improved.

In the present invention, the silicone oil used as the additive is preferably dimethyl silicone oil of dimethyl polysiloxane having the formula

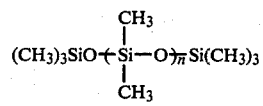

The viscosity is depending upon the number of n.

In the present invention, it is necessary to use a silicone oil having low polymerization degree and low viscosity of 500 c.s. or lower at 25° C.

Figure 1:
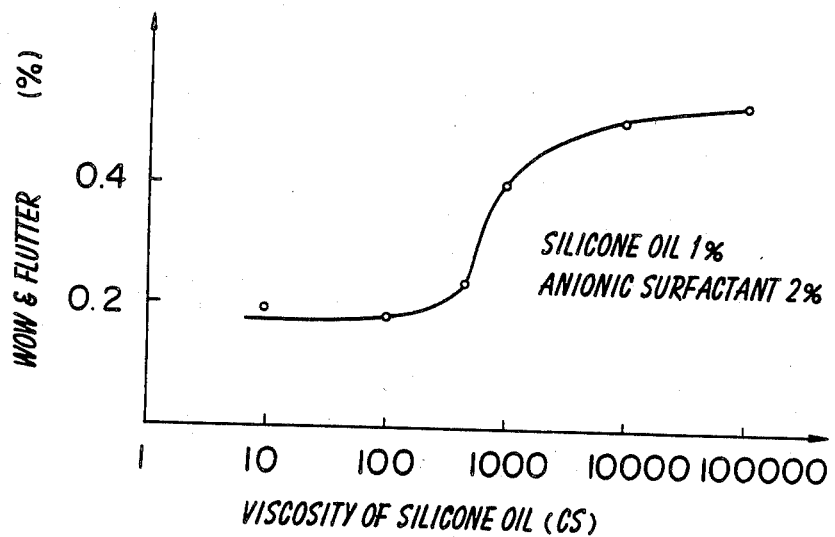
FIG. 1 shows a graph of variation of the wow and flutter measured by Japanese Industrial Standard RMS for samples prepared by incorporating the anionic surfactant at a content of 2.0% based on the magnetic powder and each silicone oil having a viscosity of 10 to 100,000 c.s. at a content of 1.0% based on the binder.

As shown in FIG. 1, when the viscosity of the silicone oil is out of the range of the present invention as higher than 500 c.s., the releasing effect of the magnetic layer is not satisfactory to overcome the blooming and the plasticization of the magnetic layer. Therefore, it is difficult to improve the wow and flutter.

Figure 2:
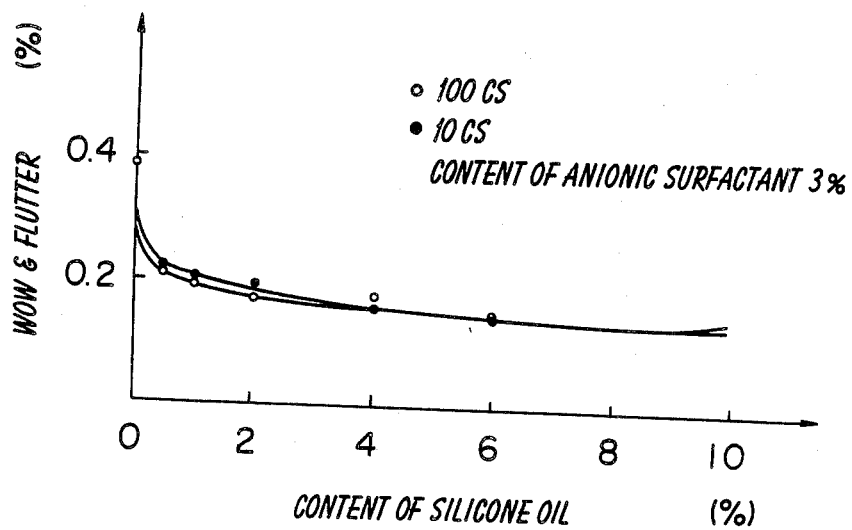
FIG. 2 shows a graph of variation of the wow and flutter measured by Japanese Industrial Standard RMS for samples prepared by incorporating the anionic surfactant at a content of 3.0% based on the magnetic powder and each silicone oil having a viscosity of 10 or 100 c.s. at various contents.

As shown in FIG. 2, the wow and flutter is suddenly improved by incorporating the silicone oil at a content of 0.5%, but is not highly improved by increasing the content over the minimum range. When the content of the silicone oil is too much, the blooming of the silicone oil is caused on the surface of the magnetic layer to disadvantageously make a stain of a magnetic head. Therefore, the maximum content of the silicone oil is about 5.0% based on the binder.

Figure 3:
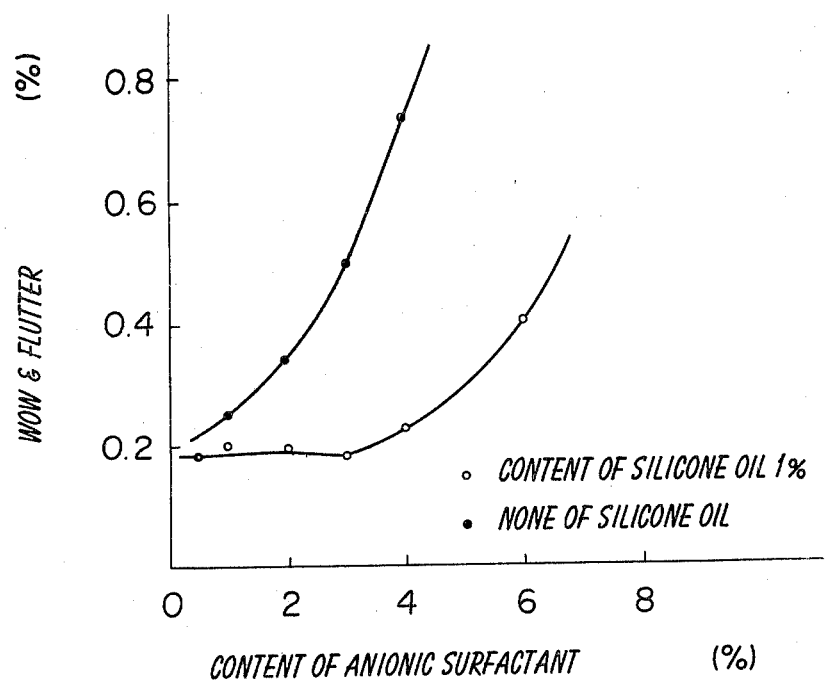
FIG. 3 shows a graph of variation of the wow and flutter measured by Japanese Industrial Standard RMS for samples prepared by incorporating the silicone oil having a viscosity of 100 c.s. at a content of 1.0% based on the binder or none and the anionic surfactant at various contents.
Figure 4:
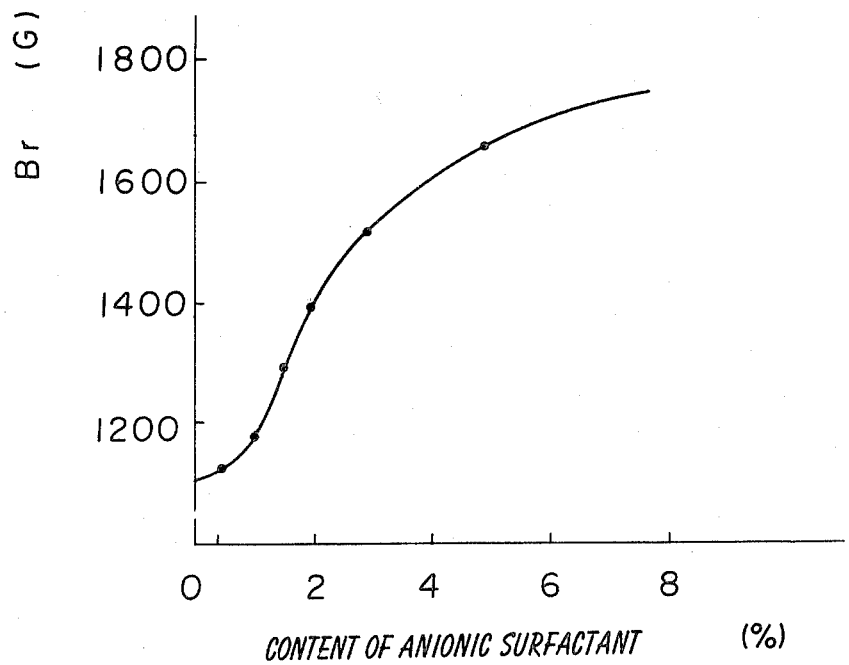
FIG. 4 shows a graph of variation of Br by incorporating the anionic surfactant at various contents without any incorporation of a silicone oil.

As shown in FIG. 3, when any silicone oil is not incorporated, the wow and flutter is highly inferior by increasing the content of an anionic surfactant over a content of 2 to 3% based on the magnetic powder. When the silicone oil (viscosity of 100 c.s.) is incorporated at a content of 1.0% based on the binder, the satisfactory wow and flutter is given by the incorporation of the anionic surfactant at a content of up to 5.0% based on the magnetic powder.

The nonionic and anionic surfactants used in the present invention can be surfactants suitable for improving the dispersibility of the magnetic powder. These surfactants are well known and are not recited.

The magnetic powders, the binders and the substrate used in the present invention can be the conventional magnetic powders, binders and substrates which are disclosed in the prior arts and the former applications. Therefore, the description of these components is not recited.

The present invention will be further illustrated by certain examples and references which are provided for purposes of illustration only and are not intended to be limiting the present invention.

EXAMPLE

| | | |
|---|---|---|
| γ-Fe$_2$O$_3$ magnetic powder: | 100 | wt. parts |
| Vinyl chloride-vinyl acetate-vinyl alcohol copolymer: | 20 | " |
| Nitrile butyl rubber: | 5 | " |
| Silicone oil (10–100,000 c.s.): | 0–10 | " |
| Anionic surfactant: (GAFAC RE 610) | 0–10 | " |
| Methyl ethyl ketone: | 60 | " |
| Methyl isobutyl ketone: | 60 | " |
| Toluene | 60 | " |

A viscosity and a content of the silicone oil and a content of the anionic surfactant were varied as shown in Figures.

The components were charged in a ball mill and were dispersed for 20 hours to obtain each magnetic powder composition.

Each magnetic powder composition was coated on a polyethyleneterephthalate film in a thickness of 12 μm to give a dry thickness of about 6 μm. After drying the magnetic layer, the magnetic layer was processed by a mirror plane processing by a calender roll having a heated surface and the product was cut in a width of 3.81 mm to obtain each audio cassette tape.

The wow and flutter was measured for the audio cassette tape near the core by a wow-flutter meter manufactured by Meguro Denpa Co.

The results are shown in Figures.

We claim:

1. In a magnetic recording medium having a magnetic layer which comprises a magnetic powder, a binder and a nonionic or anionic surfactant in an amount of 1.0 to 5.0 wt. % based on said magnetic powder, the improvement comprising within said magnetic layer of 0.5 to 5.0 wt. % based on said binder of a silicone oil of the formula

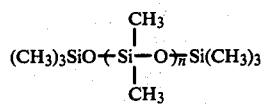

where n is a value such that the viscosity of the silicone oil is 500 c.s. or lower at 25° C., whereby the blooming of the surfactant and the plasticization of the magnetic layer are diminished.